US006996310B2

(12) United States Patent
Wang et al.

(10) Patent No.: US 6,996,310 B2
(45) Date of Patent: Feb. 7, 2006

(54) DIRECTIONAL-COUPLER ASSISTED ADD/DROP FILTER WITH INDUCED ON/OFF SWITCHING AND MODULATION

(75) Inventors: Tairan Wang, Brighton, MA (US); Pierre Villeneuve, Boston, MA (US)

(73) Assignee: Cambrius, Inc., Waltham, MA (US)

( * ) Notice: Subject to any disclaimer, the term of this patent is extended or adjusted under 35 U.S.C. 154(b) by 72 days.

(21) Appl. No.: 10/096,616

(22) Filed: Mar. 7, 2002

(65) Prior Publication Data

US 2002/0118923 A1    Aug. 29, 2002

Related U.S. Application Data (63) Continuation-in-part of application No. 09/619,926, filed on Jul. 20, 2000, now Pat. No. 6,512,866, which is a continuation of application No. 09/080,037, filed on May 15, 1998, now Pat. No. 6,101,300, which is a continuation-in-part of application No. 08/968,314, filed on Nov. 12, 1997, now Pat. No. 6,130,969, which is a continuation-in-part of application No. 08/871,747, filed on Jun. 9, 1997, now abandoned.

(51) Int. Cl.
    G02B 6/26        (2006.01)
(52) U.S. Cl. .......................................... 385/27; 385/50
(58) Field of Classification Search .................. 385/27, 385/50, 42, 41, 37, 24
    See application file for complete search history.

(56) References Cited

U.S. PATENT DOCUMENTS

| | | | |
|---|---|---|---|
| 4,155,056 A * | 5/1979 | Cross et al. ................. 333/195 |
| 4,900,119 A | 2/1990 | Hill et al. | |
| 5,486,943 A * | 1/1996 | Sasayama et al. ............ 398/75 |
| 6,222,958 B1 * | 4/2001 | Paiam ......................... 385/24 |
| 6,289,151 B1 * | 9/2001 | Kazarinov et al. ............ 385/32 |
| 6,567,573 B1 * | 5/2003 | Domash et al. ............... 385/16 |
| 2002/0186920 A1 * | 12/2002 | Viens et al. .................. 385/27 |

FOREIGN PATENT DOCUMENTS

| WO | WO 98/05995 | 2/1998 |
|---|---|---|
| WO | WO 01/73994 | 10/2001 |

OTHER PUBLICATIONS

B. E. Little et al. Microring resonator channel dropping filters. Journal of Lightwave Technology, vol. 15 No. 6, pp. 998-1005, Jun. 1997.*

(Continued)

Primary Examiner—Rodney Bovernick
Assistant Examiner—Mike Stahl
(74) Attorney, Agent, or Firm—Gauthier & Connors LLP (57) ABSTRACT

An electromagnetic field frequency filter which includes a bus waveguide that carries a signal having a plurality of frequencies, including a desired frequency, and a drop waveguide. A resonator-system is coupled to the bus and drop waveguides via directional couplers and transfers the desired frequency from the bus waveguide to the drop waveguide while allowing transmission of the remaining frequencies in the bus waveguide. The input signal in the bus waveguide is coupled from the bus waveguide to the resonator-system by a first directional coupler. The resonator-system includes two sub-elements each comprising at least one resonator. The first directional coupler splits the input signal into two preferably equal parts and directs each part into a resonator sub-element. The desired frequency is transferred to the drop waveguide by a second directional coupler. The non-desired frequencies are returned to the bus waveguide, in the forward direction, by the first directional coupler.

25 Claims, 12 Drawing Sheets

OTHER PUBLICATIONS

H. A. Haus et al. Theory of cascaded quarter wave shifted distributed feedback resonators. IEEE Journal of Quantum Electronics, vol. 28 No. 1, pp. 205-213, Jan. 1992.*

"Proposal of a Phase Shifted Bragg Grating Assisted MZI for Add-Drop Multiplexing," T. Augustsson. *IEEE Proc.-Optoelectron.* Oct./Dec. 2001. vol. 148, No. 5/6.

"Phase-Shifted Fiber Bragg Gratings and their Application for Wavelength Demultiplexing," Agrawal et al. *IEEE Photonics Technology Letters.* Aug. 1994. vol. 6, No. 8.

"Single-Mode Waveguide Microcavity for fast Optical Switching," Villeneuve et al. *Optics Letters.* Dec. 1996. vol. 21, No. 24.

"Mode-Coupling Analysis of Multipole Symmetric Resonant Add/Drop Filters," Khan et al. *IEEE Journal of Quantum Electronics.* Oct. 1999. vol. 35, No. 10.

* cited by examiner

DIRECTIONAL-COUPLER ASSISTED ADD/DROP FILTER WITH INDUCED ON/OFF SWITCHING AND MODULATION

PRIORITY INFORMATION

This application is a continuation-in-part application of Ser. No. 09/619,926 filed Jul. 20, 2000, now U.S. Pat. No. 6,512,866, which is a continuation of Ser. No. 09/080,037 filed May 15, 1998, now U.S. Pat. No. 6,101,300, which is a continuation-in-part of Ser. No. 08/968,314 filed Nov. 12, 1997, now U.S. Pat. No. 6,130,969, which is a continuation-in-part of Ser. No. 08/871,747 filed Jun. 9, 1997, now abandoned.

BACKGROUND OF THE INVENTION

In modern DWDM systems, it is essential to have devices that can add and drop signals to and from a stream of signals. In U.S. Pat. No. 6,101,300, a bus waveguide and a drop waveguide are coupled to a resonator-system. At the resonant frequency of the resonator-system, a desired signal can be completely transferred from the bus waveguide to the drop waveguide. Higher order filters are realized by increasing the number of resonators. U.S. Pat. No. 6,101,300 also describes various switching mechanisms for providing on/off switching and modulation.

SUMMARY OF THE INVENTION

In accordance with exemplary embodiments of the invention, there is provided an add/drop filter that employs directional couplers to couple the resonator-system to the waveguides. The directional-coupler assisted (DCA) add/drop filter is another exemplary embodiment of the invention in which the resonator-system is coupled to the bus and drop waveguides via directional couplers. One advantage of this embodiment is improved tolerance to parameter variations.

In another exemplary embodiment of the invention there is provided an electromagnetic field frequency filter that includes a bus waveguide that carries a signal having a plurality of frequencies, including a desired frequency, and a drop waveguide. A resonator-system is coupled to the bus and drop waveguides via directional couplers and transfers the desired frequency from the bus waveguide to the drop waveguide while allowing transmission of the remaining frequencies in the bus waveguide. The input signal in the bus waveguide is coupled from the bus waveguide to the resonator-system by a first directional coupler. The resonator-system includes two sub-elements each comprising at least one resonator. The first directional coupler splits the input signal into two preferably equal parts and directs each part into a resonator sub-element. The desired frequency is transferred to the drop waveguide by a second directional coupler. The non-desired frequencies are returned to the bus waveguide, in the forward direction, by the first directional coupler.

Various types of resonators can be used in the DCA filter, such as photonic-crystal resonators (including grating-based resonators), in-line resonators, and side-coupled resonators. The resonator sub-elements can themselves be composed of sub-elements in a hierarchal manner, as described in the parent case. The number of resonators can be modified to obtain a desired filter lineshape.

The DCA filter can be switched using electrical, optical, thermal or mechanical means to induce absorption, index variation, or frequency tuning, as described in the parent case. In another exemplary embodiment, an eight-resonator filter is switched off by tuning the resonant frequencies of the resonators to an adjacent unused frequency slot so that the filter does not drop the signal at the desired frequency.

DETAILED DESCRIPTION OF THE INVENTION

Figure 1:
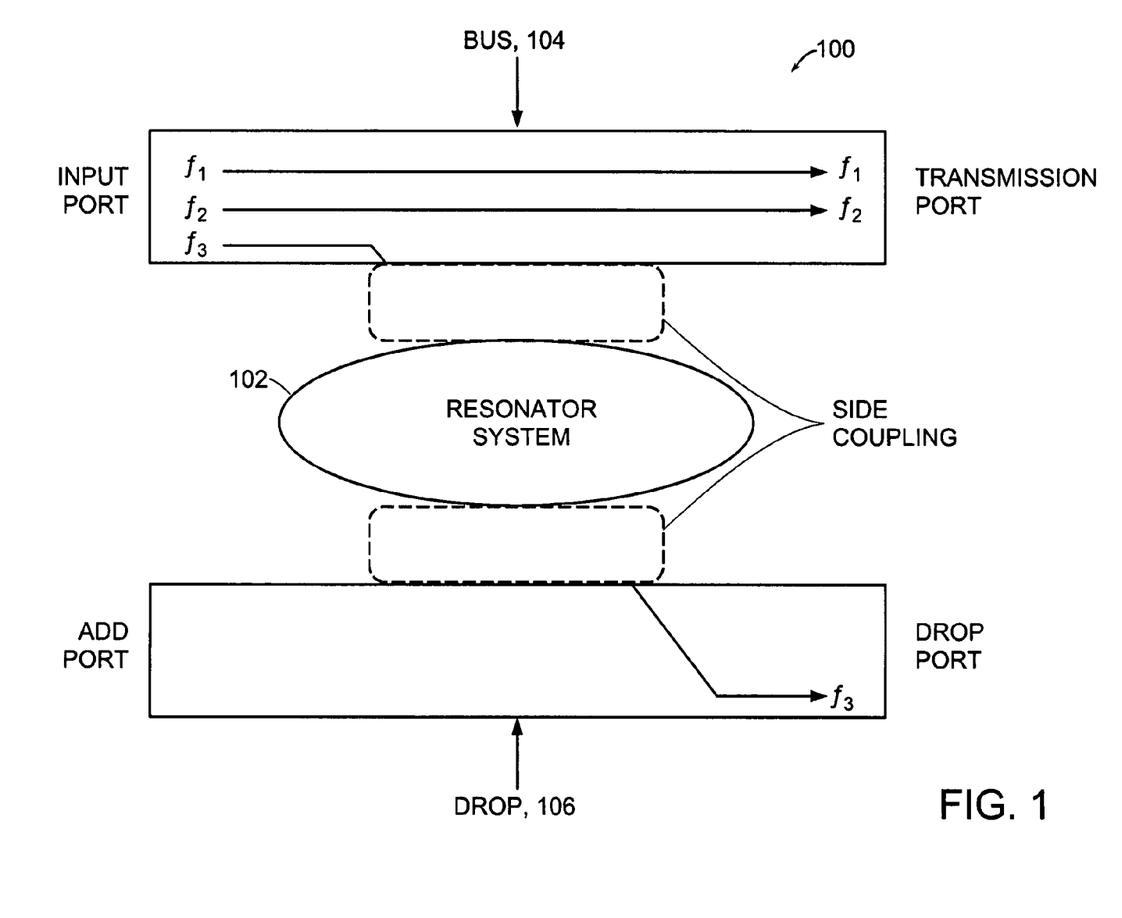
FIG. 1 is a schematic block diagram of a side-coupled filter in accordance with the invention.

FIG. 1 is a schematic block diagram of a side-coupled add/drop filter 100 in accordance with the invention. The add/drop filter includes a resonator-system 102, which supports at least two resonant modes, coupled to a bus waveguide 104 and a drop waveguide 106. The resonator-system 102 includes one or more resonators that, in addition to being coupled to the waveguides, can also be coupled among themselves. Coupling between the various resonator modes is configured to cancel reflection in the input port. On/off switching and modulation is also provided using a variety of switching mechanisms.

Figure 2:
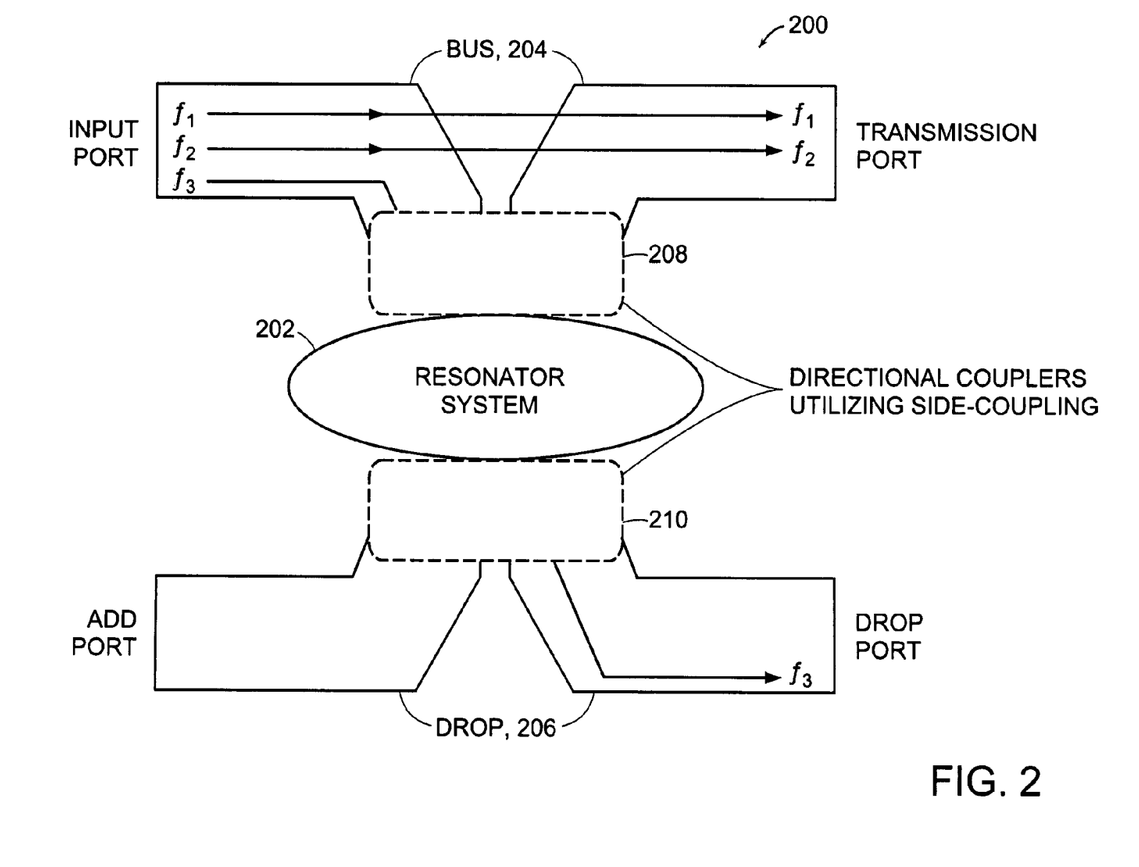
FIG. 2 is a schematic block diagram of a DCA filter in accordance with the invention.

In accordance with the invention, alternative geometries of this add/drop filter using directional couplers to couple the resonator-system to the waveguides are provided. FIG. 2 is a schematic block diagram of a DCA add/drop filter 200 in accordance with the invention. The DCA add/drop filter 200 includes a bus waveguide 204 that is coupled to a resonator-system 202 via a first directional coupler 208, and a drop waveguide 206 is coupled to the resonator-system via a second directional coupler 210. At the desired frequency, the signal inside the bus waveguide excites the resonator modes of the resonator-system. Coupling between the various resonator modes cancel reflection in the input port. In turn, the desired frequency is coupled into the drop waveguide. The resonator-system modes are designed to provide the desired spectral response for the drop port.

The resonator-system in the DCA embodiment supports at least two localized resonant modes coupled to the bus and drop waveguides. At least two of the modes have substantially the same frequency and the same quality factor. In both the side-coupled and DCA embodiments, shown in FIGS. 1 and 2, respectively, the desired frequency inside the bus excites at least two resonant modes of the resonator-system. In the side-coupled embodiment, the bus and drop waveguides are side-coupled directly to the resonator-system and in the DCA embodiment the bus and drop waveguides are coupled to the resonator-system by directional couplers.

The configuration of the DCA embodiment is mathematically equivalent to the side-coupled embodiment; there is a one-to-one mapping between them. Moreover, in both filter configurations, the signal in the drop waveguide can be made to propagate in either the forward or backward direction by changing the relative phase of the modes in the resonator-system.

The use of directional couplers has the highly-desired effect of reducing the sensitivity of the filter to parameter variations. Hence, an advantage of the DCA configuration is that it is more tolerant to parameter variations that occur during fabrication. As a result, the backward reflection in both the input and drop ports is minimized for a large range of parameter variations.

Figure 3:
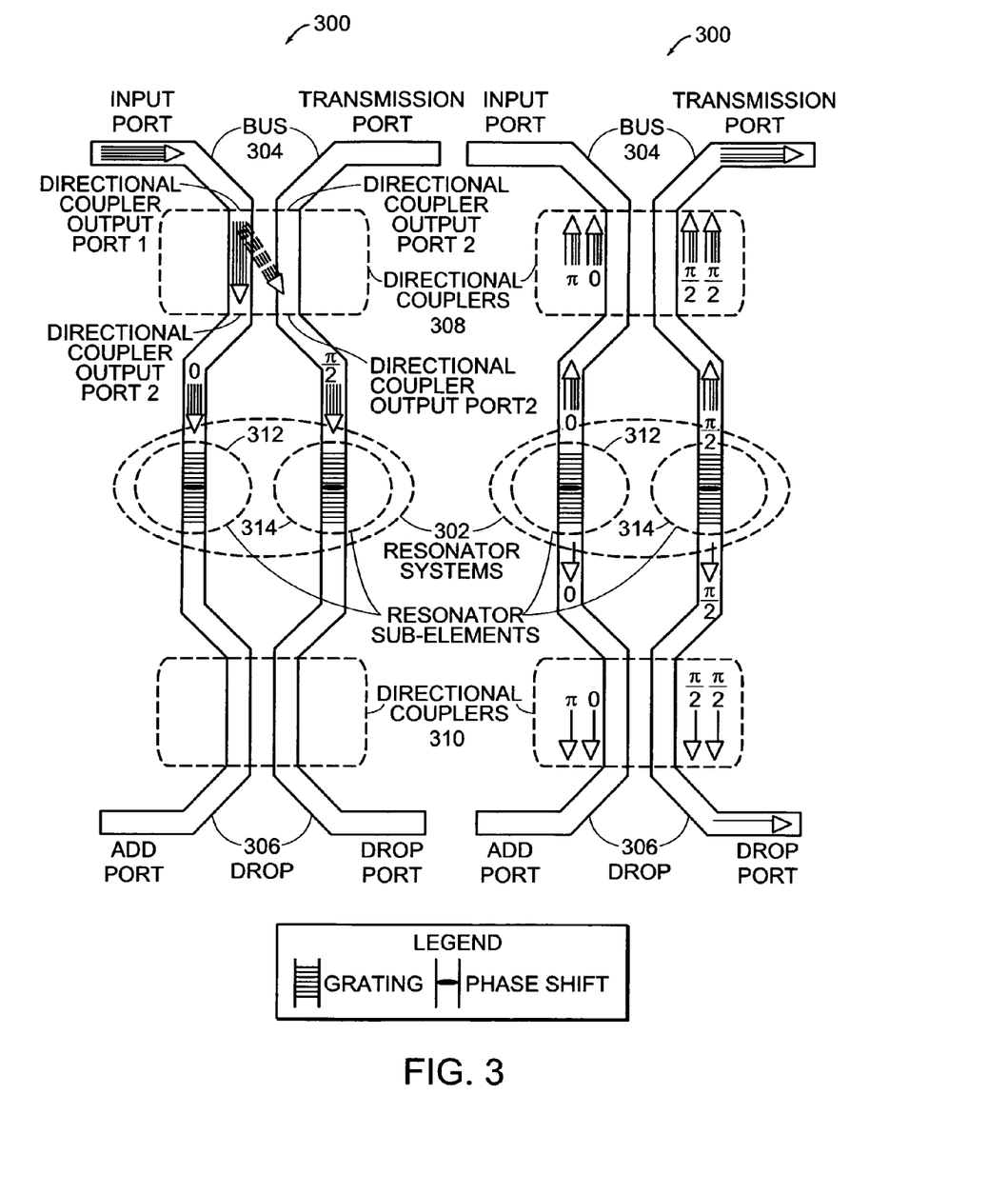
FIG. 3 is a schematic diagram of an exemplary embodiment of a DCA filter.

In an exemplary embodiment of the invention as shown in FIG. 3, a DCA add/drop filter 300 includes a resonator-system 302 coupled to bus 304 and drop 306 waveguides. The resonator-system 302 is divided into two identical grating resonator sub-elements 312, 314. The DCA filter reflection and lineshape can be independently adjusted by adjusting the parameters of two directional couplers 308, 310 and the parameters of the resonator-system, respectively. The two arms of the resonator-system preferably have the same decay rate and the same frequency.

The directional couplers split the input signal into the two arms of the resonator-system, and also recombine the signals from the two arms either into the bus or drop waveguide. The recombined signals are directed preferably in the forward direction; the desired frequency propagates into the drop waveguide while the non-desired frequencies propagate along the bus waveguide. The directional couplers are preferably 50/50 splitters or combiners so that the bus signal is equally split between the two resonator sub-elements.

In this embodiment, the input signal enters the first input port of the first directional coupler 308 and is equally split into the two output ports of the directional coupler. The second output port has a $\pi/2$ phase difference relative to the first output port of the directional coupler. The directional coupler output ports are connected to the two resonator sub-elements 312, 314. The non-resonant frequencies of the input signal are reflected by the resonator sub-elements back into the two output ports of the directional coupler. The directional coupler recombines the reflected signals into the second input port of the directional coupler, which transmits the recombined signal into the bus waveguide in the forward direction. The reflected signals in the first input port recombine destructively and produce no reflection in the input port of the bus waveguide.

Figure 4:
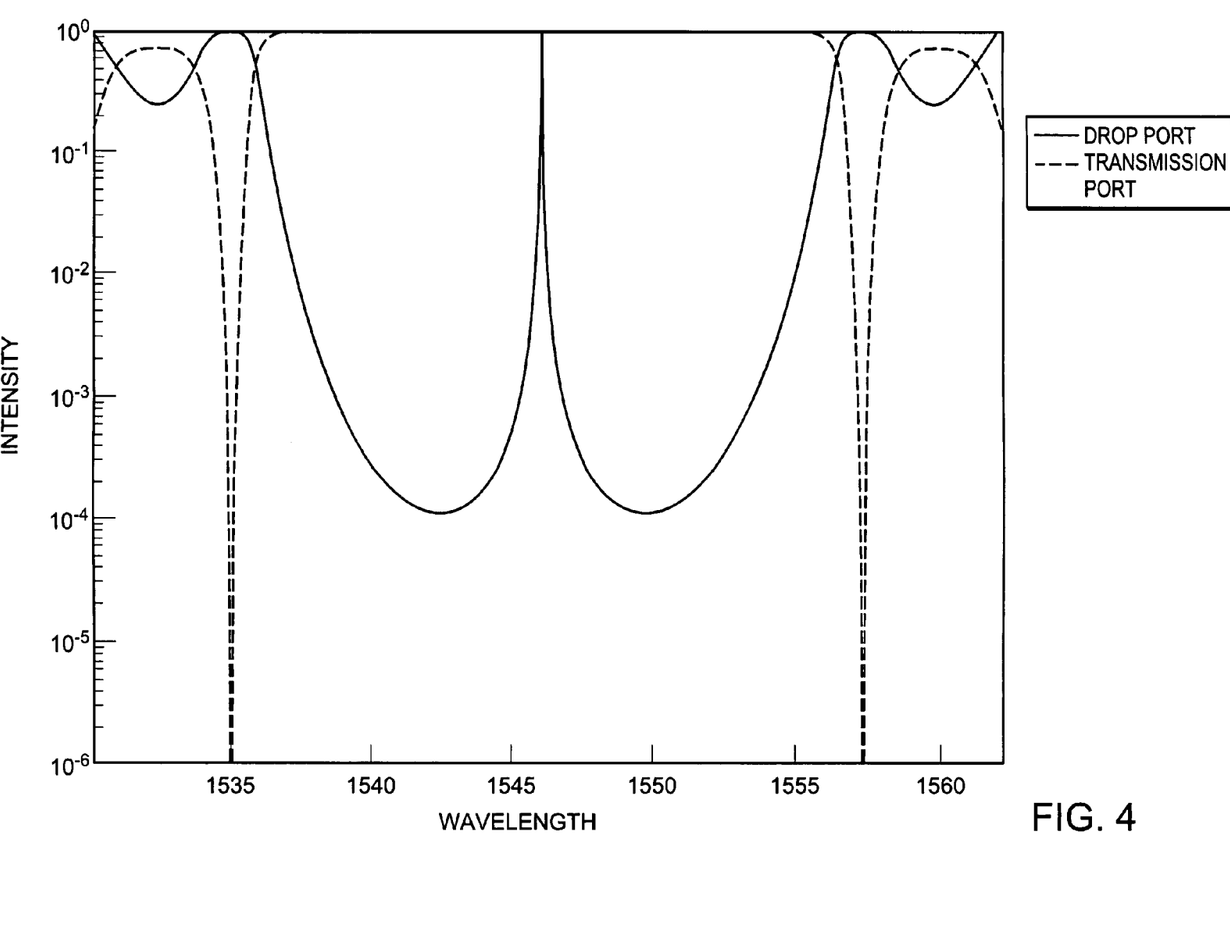
FIG. 4 is a graph showing a filter response of an exemplary two-resonator DCA filter.

The desired frequency of the input signal is transmitted through the resonator sub-elements, recombined by the second directional coupler 310, and then transmitted into the drop waveguide 306. The DCA filter response for this embodiment is shown in FIG. 4.

From symmetry, a desired frequency introduced into the add port of the drop waveguide 306 would be transferred to the bus waveguide 304. Also, a desired frequency introduced into the transmission port of the bus waveguide would be transferred to the drop waveguide.

Figure 5:
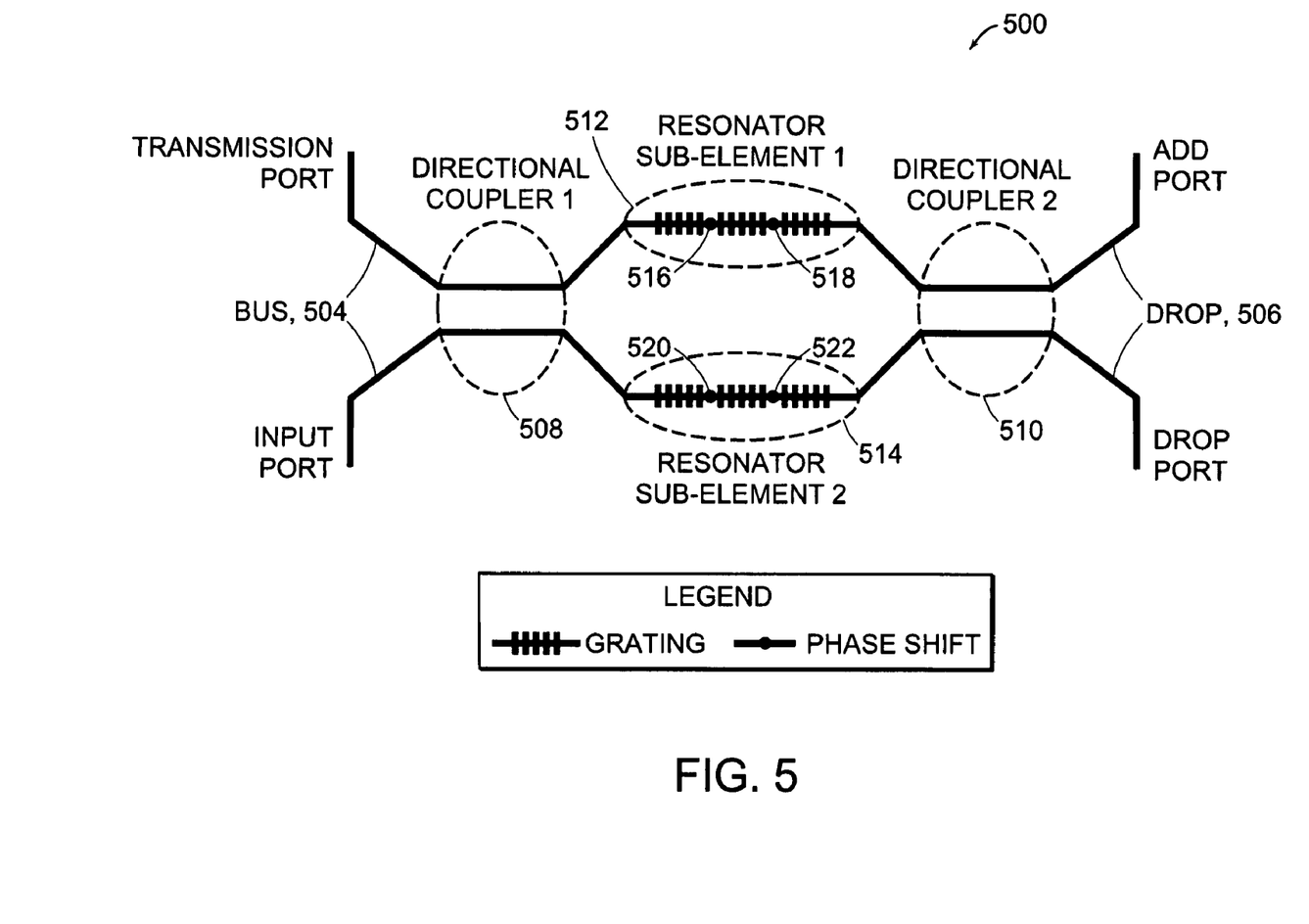
FIG. 5 is a schematic diagram of another exemplary embodiment of a DCA filter.
Figure 6:
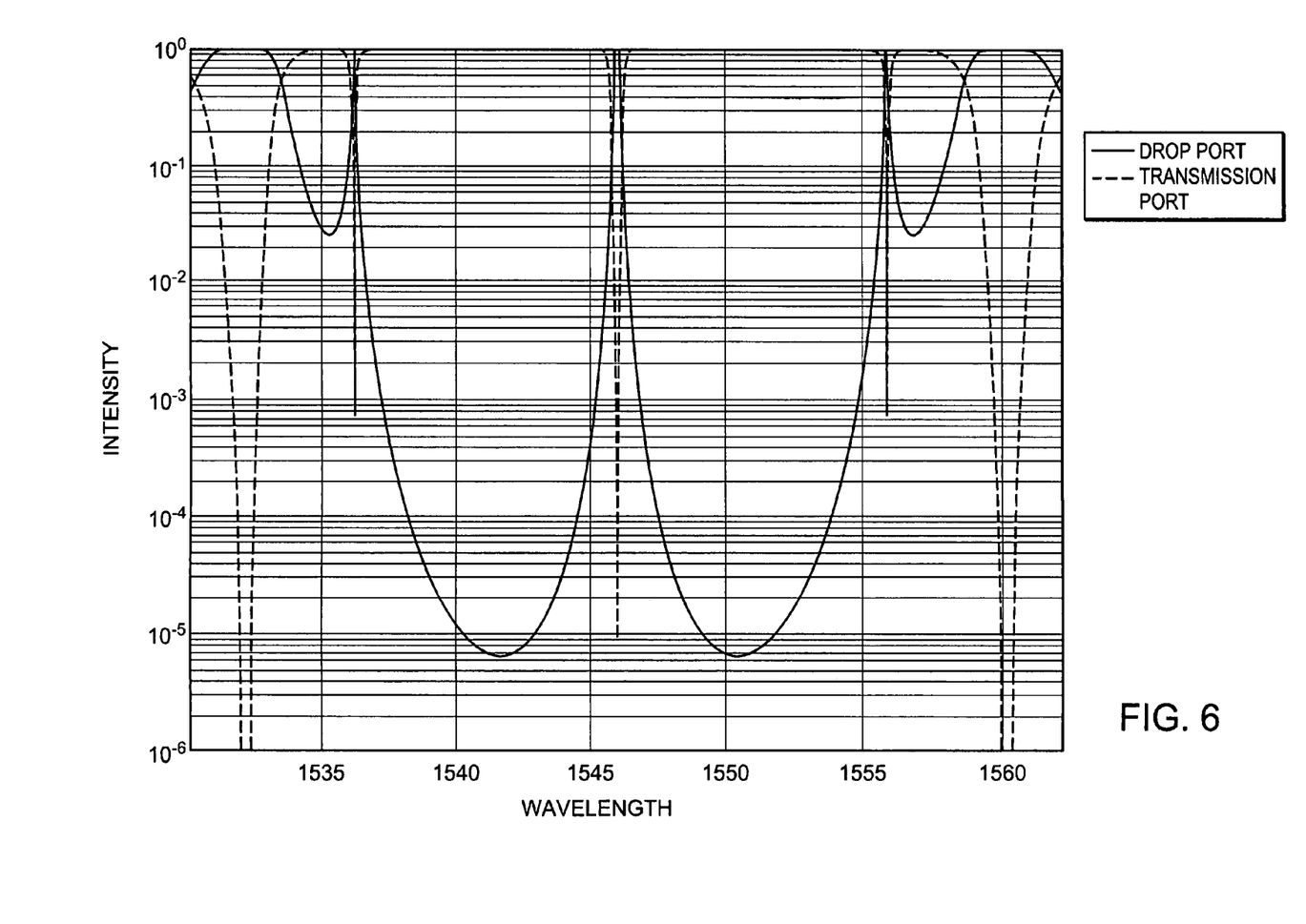
FIG. 6 is graph showing a filter response of an exemplary four-resonator DCA filter.

Direct coupling between the resonators in each resonator sub-element provides a means to achieve high-order filter functions. By increasing the number of resonators in each resonator sub-element, the lineshape of the resonator-system can be made steeper and flatter. FIG. 5 is a schematic diagram of another exemplary embodiment of a DCA add/drop filter 500 of the invention. The filter 500 includes four resonators (516, 518, 520, 522), two located in each of two resonator sub-elements 512, 514. Each resonator supports a single mode. The two resonator sub-elements are preferably spatially separated from each other to prevent direct coupling between them. Each resonator sub-element supports a sub-element mode consisting in part of a linear combination of the resonant modes of the resonator sub-elements. Coupling between the various resonator modes is specifically configured to cancel reflection in the input port. The two sub-element modes are specifically configured to have the same frequency profiles. FIG. 6 is a graph showing the frequency response of the DCA embodiment with four resonators shown in FIG. 5.

Since the non-desired frequencies are reflected by the gratings, the gratings preferably have large grating strengths so that the stop band covers the entire range of interest.

Figure 7A:
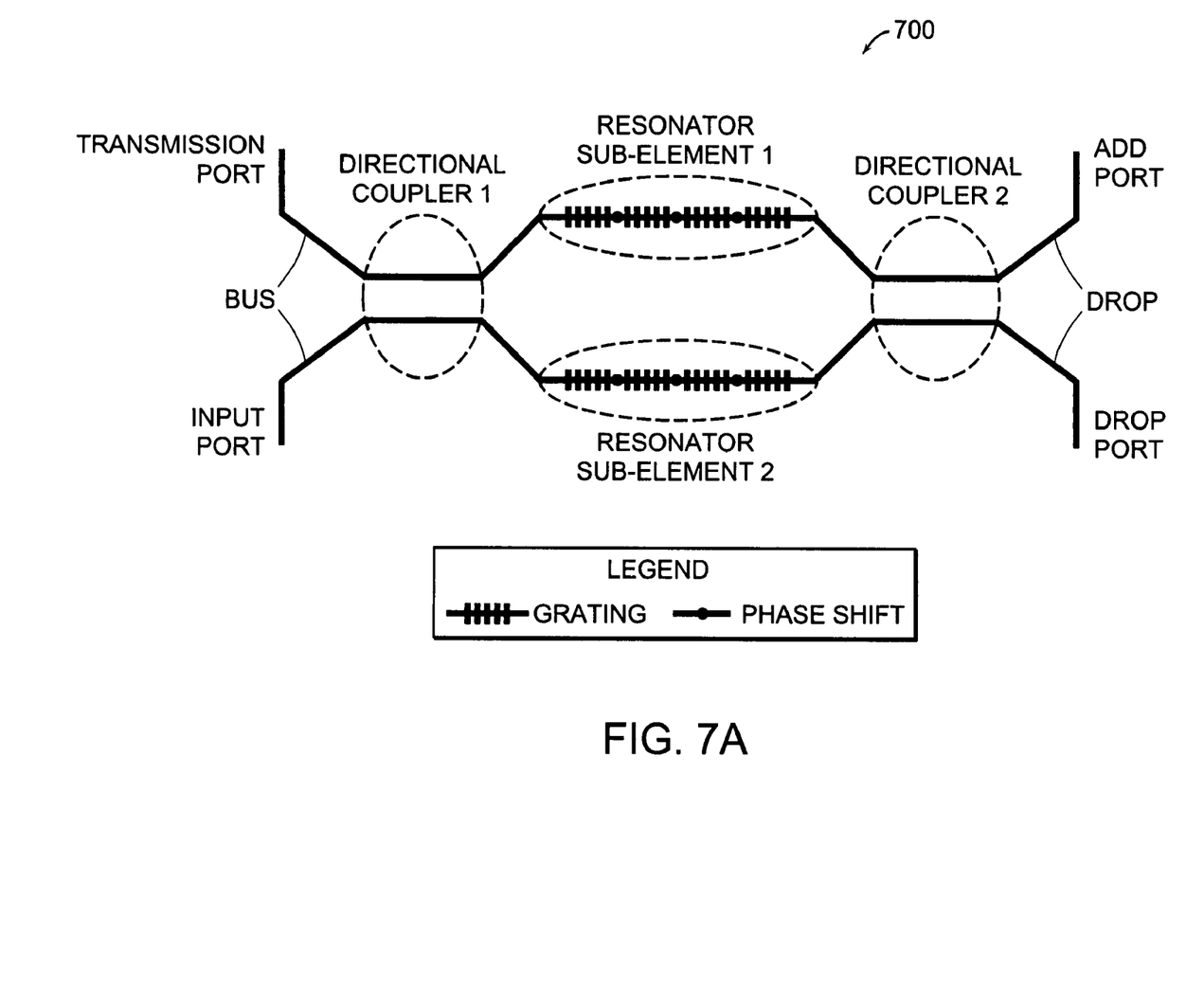
FIGS. 7A and 7B are schematic diagrams of two other exemplary embodiments of six-resonator and eight-resonator DCA filters, respectively.
Figure 7B:
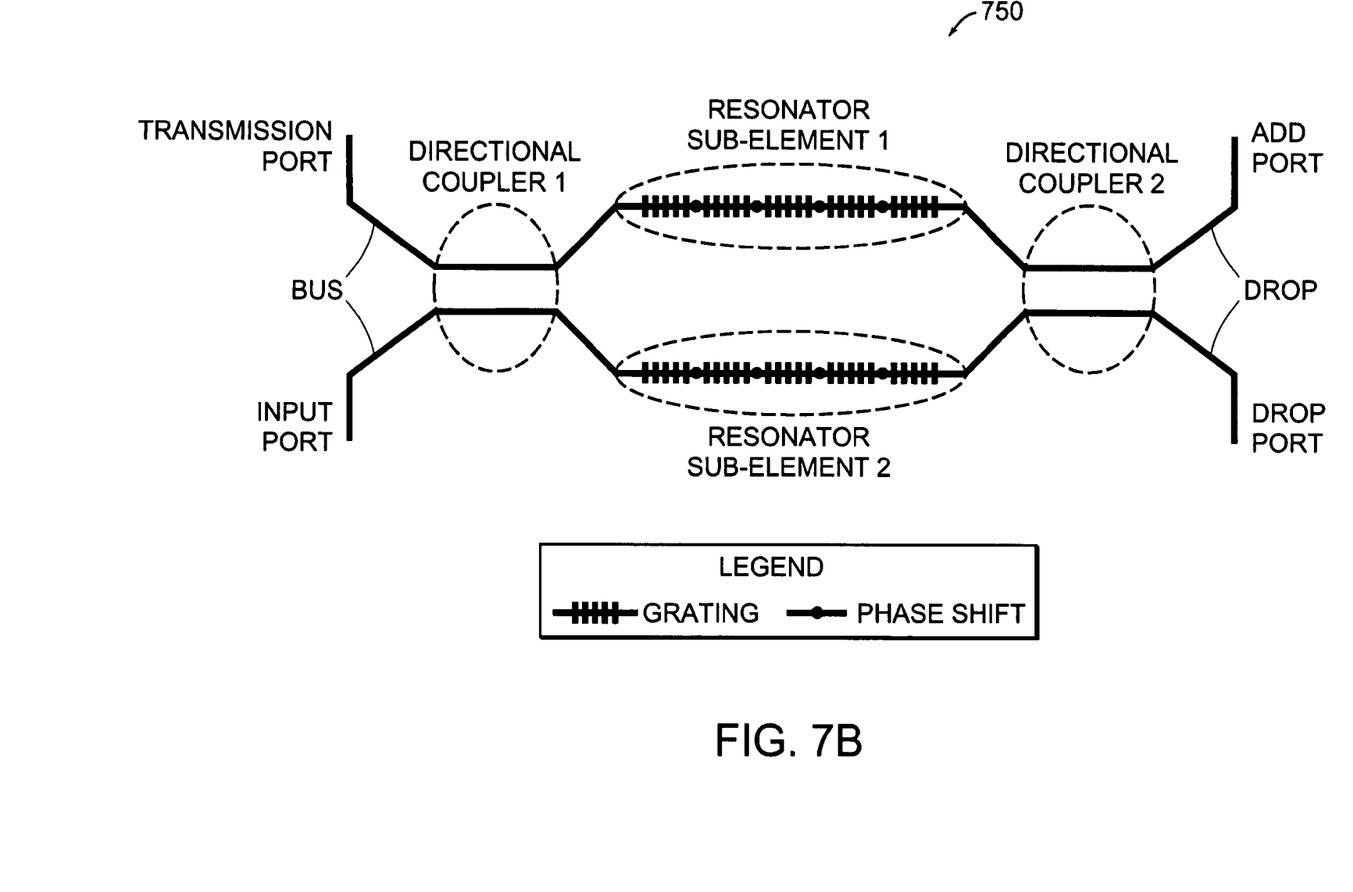
Figure 8:
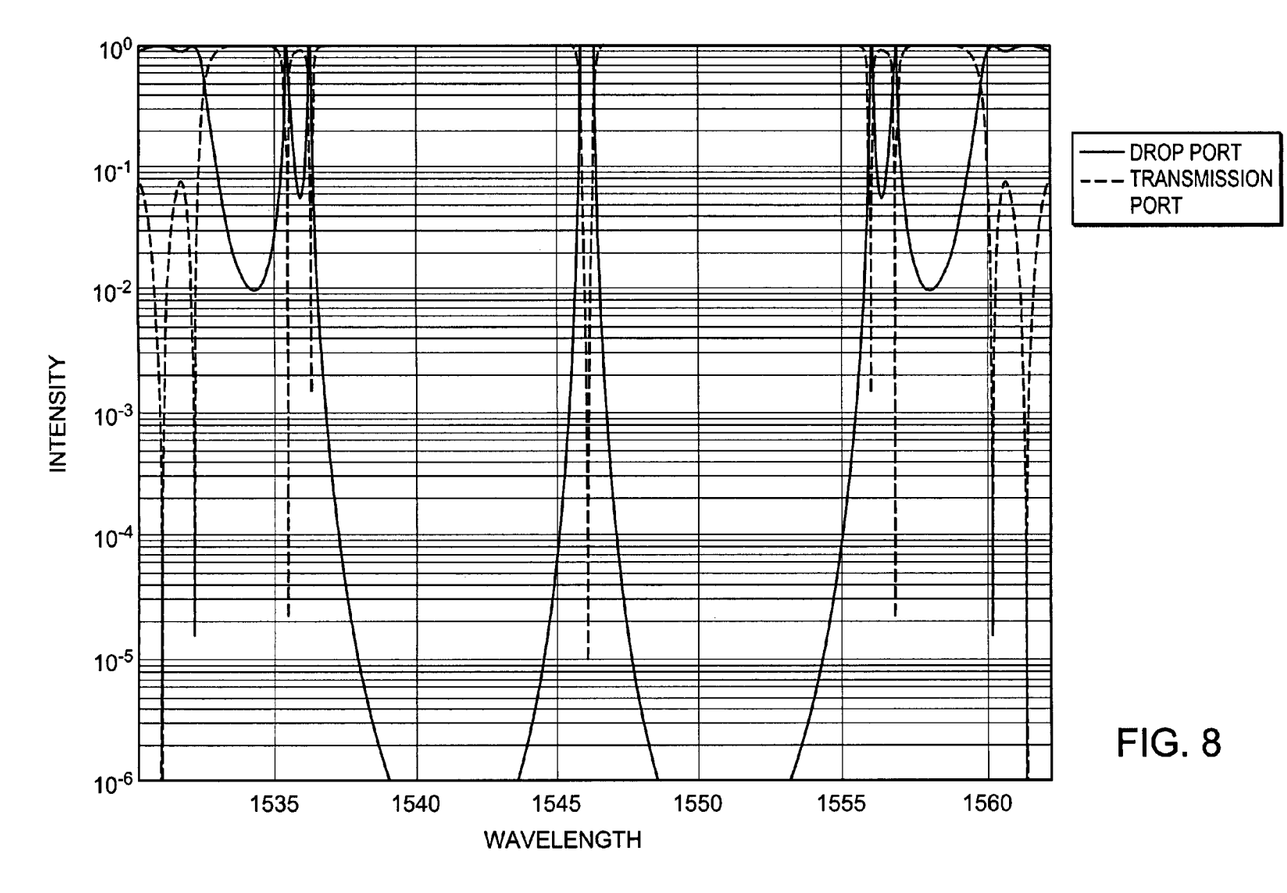
FIG. 8 is a graph showing a filter response of an exemplary six-resonator DCA filter.
Figure 9:
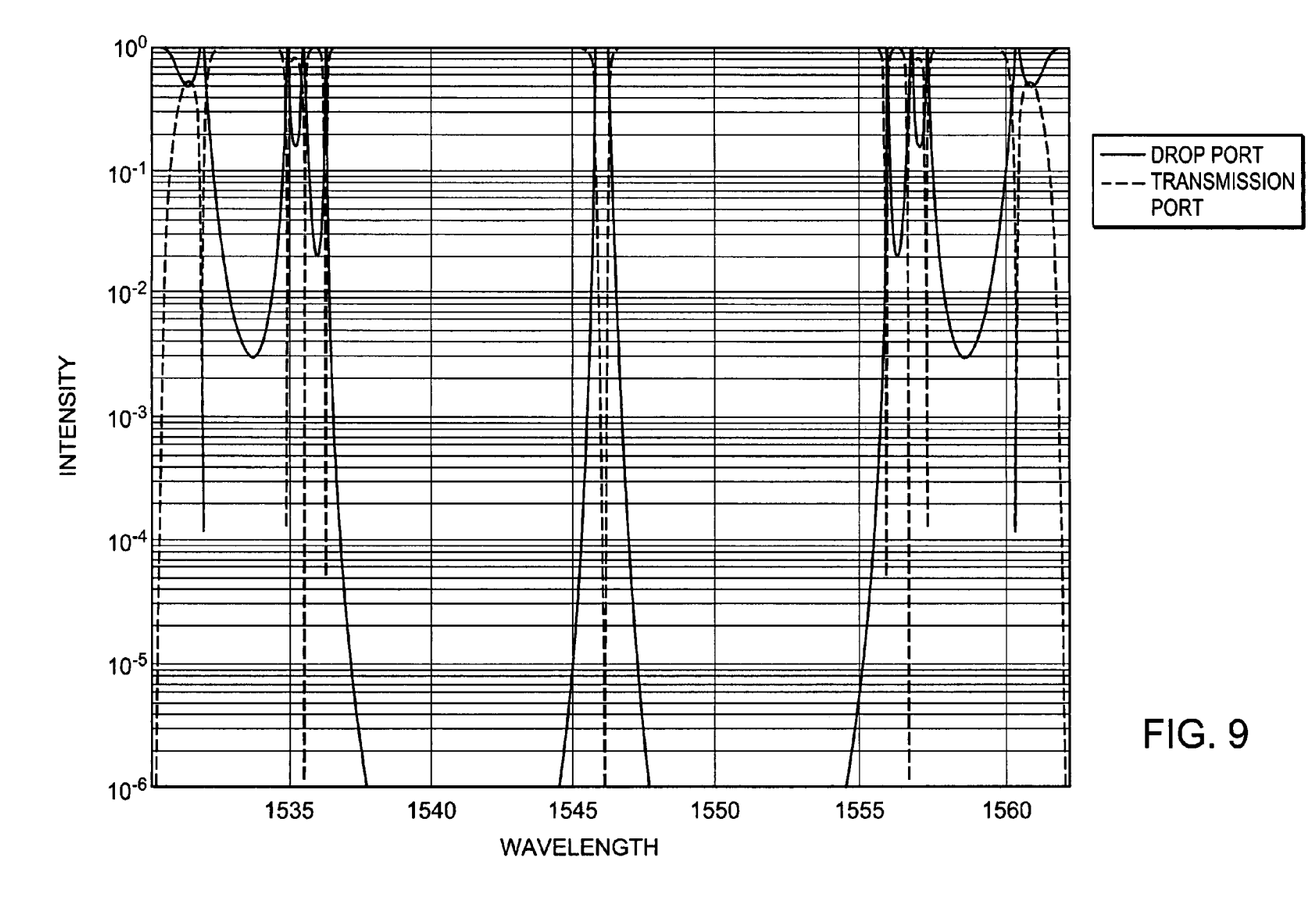
FIG. 9 is a graph showing a filter response of an exemplary eight-resonator DCA filter.

FIGS. 7A and 7B are schematic diagrams of exemplary embodiments of two DCA filters 700 and 750. The filters 700 and 750 are examples of six- and eight-resonator embodiments with two resonator sub-elements each containing three and four resonators, respectively. FIGS. 8 and 9 are graphs showing the frequency responses of the exemplary embodiments with six and eight resonators shown in FIGS. 7A and 7B, respectively. The filter lineshape becomes flatter and sharper with increasing number of resonators, as expected.

Figure 10:
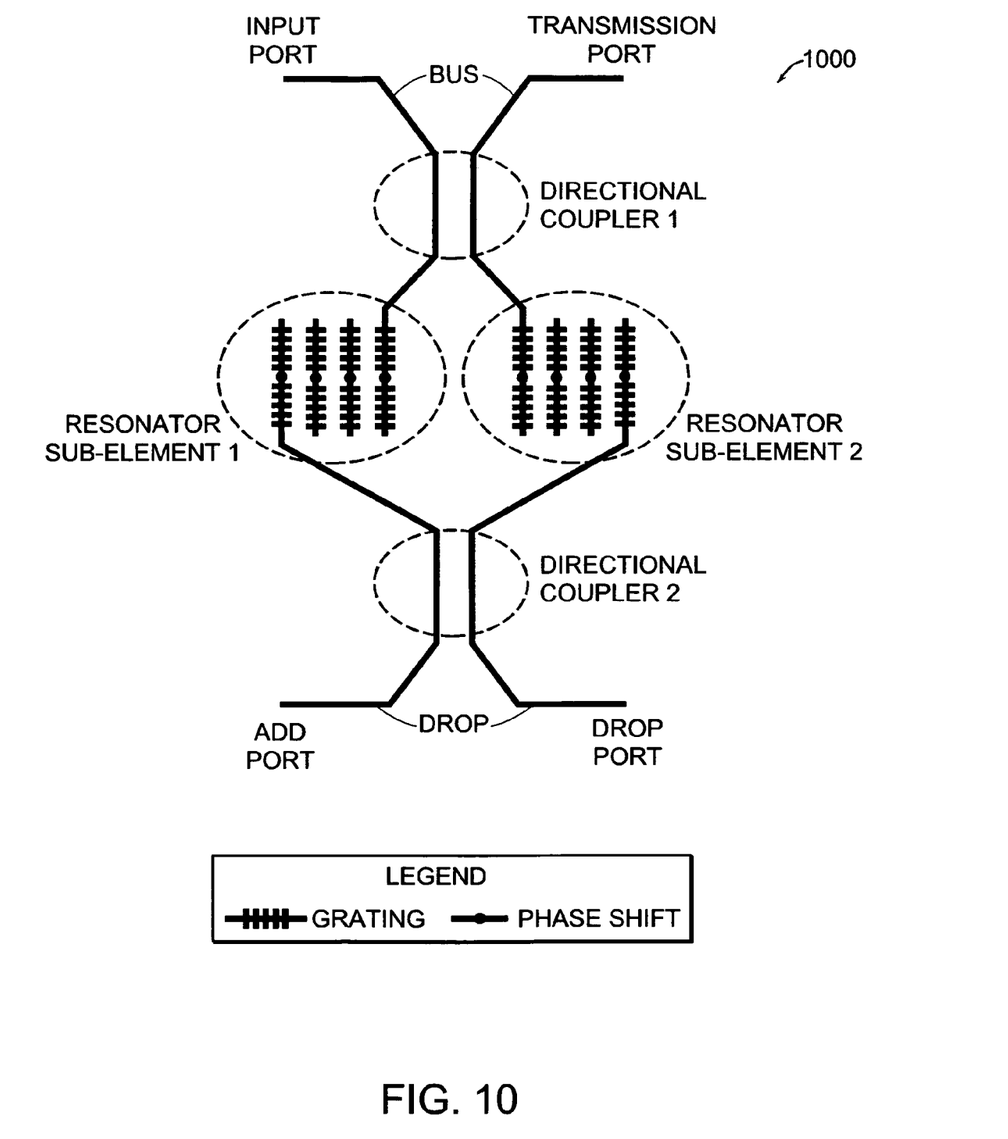
FIG. 10 is a schematic diagram of another exemplary embodiment of a DCA filter.

FIG. 10 is a schematic diagram of an exemplary embodiment of an eight-resonator DCA filter 1000 with two resonator sub-elements each containing four side-coupled resonators. The number of resonators can be extended to any desired value, although the physical layout and available space for the resonators may limit the number of resonators.

Figure 11:
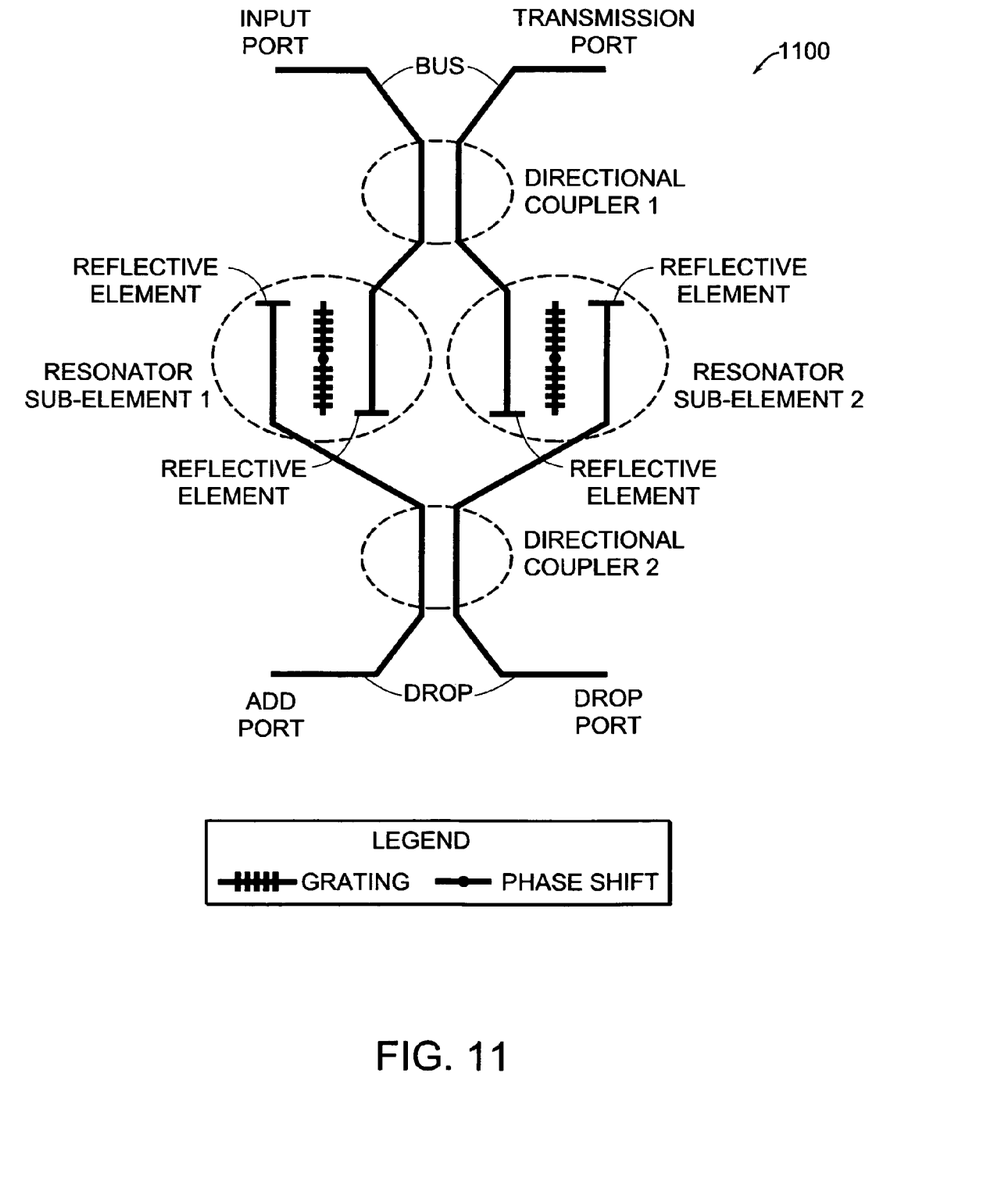
FIG. 11 is a schematic diagram of another exemplary embodiment of a DCA filter.

The resonator sub-elements can support any type of resonator, such as photonic-crystal resonators (including grating-based resonators), in-line resonators, side-coupled resonators, ring-coupled gratings, and ring resonators. Gratings are a class of photonic crystals. Photonic crystals (also known as photonic bandgap materials) are defined as composite materials with a one-dimensional, two-dimensional, or three-dimensional spatial periodic variation of electromagnetic properties such as index of refraction. FIGS. 10, and 11 show two exemplary side-coupled resonator embodiments of the invention. FIG. 11 is a schematic diagram of another exemplary embodiment of a DCA filter 1100. In the embodiment shown in FIG. 11, preferably broadband reflective elements are used to reflect the non-desired frequencies. Examples of broadband reflective elements include but are not limited to waveguide gratings and 90° waveguide terminations.

The DCA resonator-system has preferably two or more resonator sub-elements. The number of resonator sub-elements can be extended to any desired value. Each subsequent sub-element can further be subdivided in a hierarchical fashion.

All of the previously discussed embodiments can be switched using the previously mentioned switching mechanisms. For example, in a further specific embodiment of the invention, the eight-resonator DCA filter 750 of FIG. 7B is switched using a heating mechanism such as a resistive heater located above the resonator-system. When the resonator-system transfers the desired frequency to the drop waveguide, the DCA filter is in the cross state. By activating the resistive heater above the resonator-system, the resonant frequency of the resonator-system can be tuned away from the desired frequency to a vacant frequency slot, hence the desired frequency is no longer transmitted to the drop waveguide and the DCA filter is in the bar state. Other switching mechanisms described in the parent case can also be applied to the DCA filter. For example, the resonances of the resonator-system can be spoiled by absorption, thereby eliminating the drop signal.

Although the invention has been shown and described with respect to several preferred embodiments thereof, various changes, omissions and additions to the form and detail thereof, may be made therein, without departing from the spirit and scope of the invention.

What is claimed is:

1. An electromagnetic field frequency filter comprising:
   an input waveguide which carries a signal having at least one frequency including at least one desired frequency;
   an output waveguide; and
   a resonator-system coupled to said input and output waveguides by at least one directional coupler, said resonator-system transfers said at least one desired frequency to said output waveguide, said resonator-system comprising at least two waveguides each including at least one resonator sub-element, each resonator sub-element comprising at least two resonators each supporting at least one mode at or near said desired frequency.

2. The filter of claim 1, wherein at least one of said resonators supports only one mode.

3. The filter of claim 1, wherein at least two of said modes have substantially the same energy dissipation rates.

4. The filter of claim 1, wherein each said resonators supports only one mode.

5. The filter of claim 4, wherein said resonators in at least one resonator sub-element support at least one resonator sub-element mode comprising a linear combination of the resonant modes of said resonator sub-element, said resonator-system being specifically configured such that said resonator sub-element mode has substantially the same frequency profile as the sub-element mode of at least one other resonator sub-element.

6. The filter of claim 1, wherein said resonator-system is specifically configured such that reflection of the desired frequency in the input port in cancelled.

7. The filter of claim 1, wherein each of said input and output waveguides is physically connected to at least one said resonator sub-element by a waveguide.

8. The filter of claim 1, wherein said resonator-system comprises at least one periodic dielectric structure.

9. The filter of claim 8, wherein said periodic dielectric structure comprises at least one phase shift defining at least one resonator.

10. An electromagnetic field frequency filter comprising:
    an input waveguide which carries a signal having at least one frequency including at least one desired frequency;
    an output waveguide; and
    a resonator-system coupled to said input and output waveguides by at least one directional coupler, said resonator-system transfers said at least one desired frequency to said output waveguide, said resonator-system being comprised of at least two waveguides each including at least one resonator sub-element, each resonator sub-element supporting at least one mode at or near said desired frequency, said resonator sub-elements each comprising at least one periodic dielectric structure with at least one phase shift defining a resonator.

11. The filter of claim 10, wherein each of said input and output waveguides is physically connected to at least one said resonator sub-element by a waveguide.

12. The filter of claim 10, wherein each said resonator sub-element comprises at least one periodic dielectric structure and at least two phase shifts each defining a resonator.

13. The filter of claim 12, wherein each said resonator supports only one mode.

14. An electromagnetic field frequency filter comprising:
    an input waveguide which carries a signal having at least one frequency including at least one desired frequency;
    an output waveguide; and
    a resonator-system coupled to said input and output waveguides by at least one directional coupler, said resonator-system comprising at least two waveguides each including at least one resonator sub-element, each resonator sub-element comprising at least two resonators each supporting at least one mode, said resonator-system being operable for the adjustable transfer of said at least one desired frequency to said output waveguide by differentially changing the internal decaying rate or resonance frequency of at least one of said resonators.

15. The filter of claim 14, wherein said resonator-system comprises at least one periodic dielectric structure with at least one phase shift defining at least one resonator.

16. The filter of claim 14, wherein said internal decaying rate or resonance frequency of said at least one resonator is varied by changing the absorption characteristics or index of refraction of said resonator.

17. The filter of claim 14, wherein said internal decaying rate or resonance frequency of said at least one resonator is varied by an electrical, thermal, optical, or mechanical means.

18. The filter of claim 14, wherein said input waveguide has an input port and an output port, said output waveguide has a forward port and a backward port, and said internal decaying rate or resonance frequency of said at least one resonator is varied to provide selective switching of said desired frequency into either the output port or the forward port.

19. The filter of claim 14, wherein said input waveguide has an input port and an output port, said output waveguide has a forward port and a backward port, and said internal decaying rate or resonance frequency of said at least one resonator is varied to provide selective splitting of said desired frequency into at least two of said four ports.

20. The filter of claim 14, wherein said resonator sub-elements support at least two sub-element modes with substantially the same energy dissipation rates when said transfer occurs substantially.

21. An electromagnetic field frequency filter comprising:
    an input waveguide which carries a signal having at least one frequency including at least one desired frequency;
    an output waveguide; and
    a resonator-system coupled to said input and output waveguides by at least one directional coupler, said resonator-system comprising at least two waveguides each including at least one resonator sub-element, each resonator sub-element comprising at least one periodic dielectric structure with at least two phase shifts each defining a resonator, said resonator-system being operable for the adjustable transfer of said at least one desired frequency to said output waveguide by differentially changing the index of refraction or the absorp tion in the vicinity of at least one resonator of said resonator-system.

22. The filter of claim 21, wherein said resonator-system is specifically configured such that reflection of the desired frequency in the input port in cancelled.

23. The filter of claim 21, wherein each said resonator sub-element supports at least one mode at or near said desired frequency when said transfer occurs substantially.

24. The filter of claim 21, wherein each resonator of said resonator sub-elements supports only one mode.

25. The filter of claim 21, wherein each said input and output waveguide is physically connected to at least one said resonator sub-element by a waveguide.

* * * * *